Figure 1:
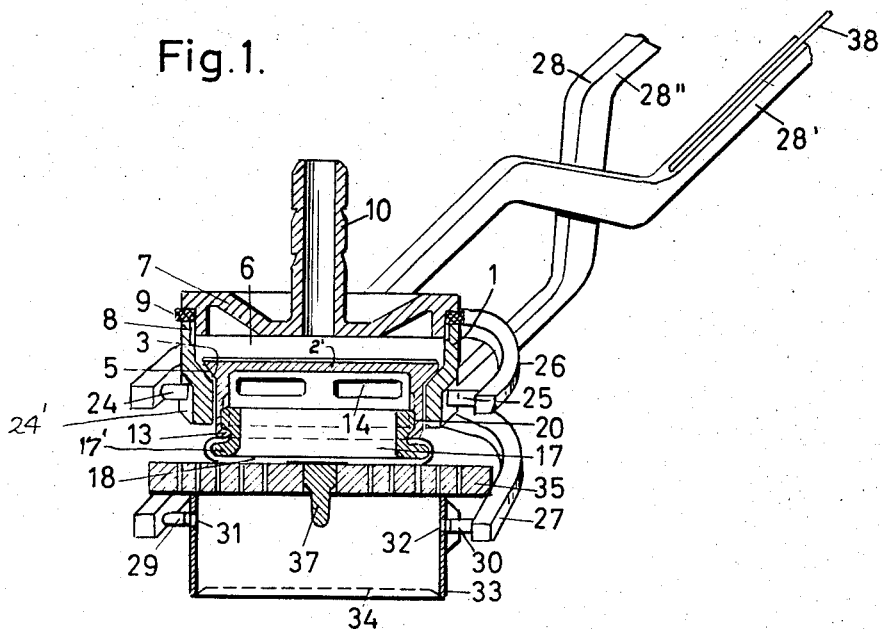

Oct. 3, 1967     C. NEEF     3,344,680

CLEANING DEVICE FOR MEAT GRINDER CUTTING PLATE

Filed Oct. 18, 1965

INVENTOR:
Clemens Neef

By Sparrow and Sparrow

Attorneys

United States Patent Office 3,344,680
Patented Oct. 3, 1967

3,344,680
CLEANING DEVICE FOR MEAT GRINDER
CUTTING PLATE
Clemens Neef, Freiherr von Stein-Strasse 2,
Alzey, Germany
Filed Oct. 18, 1965, Ser. No. 496,829
12 Claims. (Cl. 15—407)

This invention relates to cleaning devices for food processing machines in general and to a cleaning device for cutting plates of meat-grinding machines. The invention consists in such novel features, construction arrangements, combinations of parts and improvements as may be shown and described in connection with the apparatus herein disclosed by way of example only and as illustrative of a preferred embodiment.

There are machines in butcher shops, meat counters, in supermarkets and in meat processing plants, in which a typical cutting plate is arranged having a plurality of holes through which the comminuted product is discharged. The holes of these cutting plates become clogged during the daily operation, and it is usually difficult to clean them after the end of the shift.

Attempts have been made to provide for a plate having protruding pins for piercing through the meat-clogged holes. Other devices have been known in which the cutting plate is immersed in a container in which a pad consisting of an elastic material is arranged below the cutting plate to be cleaned. This elastic material is soaked with a cleaning fluid which is supposed to be pushed through the holes of the plate. The operation of this device comprises pushing the cutting plate, which may be held by a resilient support ring, with the aid of push rod downward against the elastic material. However, the cutting plate or the resilient support ring must correspond in size exactly to the internal diameter of the container, so that the cleaning fluid actually will be pressed through the holes preventing the fluid from escaping through an easier path.

These devices have been found unsuccessful in practice, and have operative faults. The mechanical devices having pins are confined to specific sizes of plate diameter, hole diameter and hole patterns. The cleaning apparatus using the cleaning fluid-soaked pad also must have a container with the fitting diameter, but particularly the cleaning fluid will be contaminated within a short time by the particles which have been cleaned out, so that the cleansing power of the fluid is diminished and/or ceases to be usable.

This invention is directed to an improvement of these conditions, and objects and advantages of the invention will be set forth in part hereafter and in part will be obvious herefrom or may be learned by practicing the invention, the same being realized and attained by means of the instrumentalities and combinations pointed out in the appended claims.

It is the general object of this invention to provide for contrivances for fast and thorough cleaning of cutting plates of meat grinders.

Furthermore, it is an object of the present invention to provide a device by which the cleaning fluid is pressed through the holes to be cleaned in order to displace efficiently the particles to be removed.

Another object of the present invention is to provide a device in which the admittance of the cleaning fluid to the plate depends upon the pressing of the plate against the fluid-emitting head, so that no loss of cleaning fluid may occur.

A further object of the present invention is to provide means by which the still usable particles which have been driven out of the holes of the plate are separated from the cleaning medium, in order to be collected and to be used for secondary purposes.

Yet another object of the present invention is to provide an apparatus which is uncomplicated, easily operated by hand and is economical in use.

Figure 2:
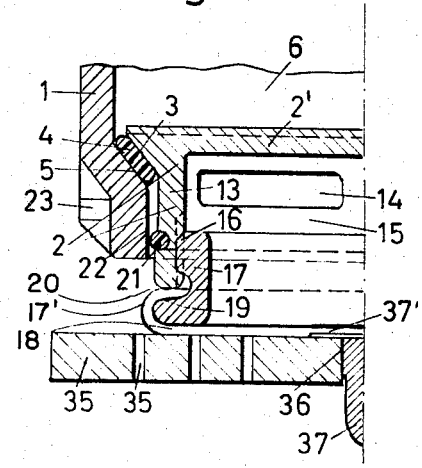

Various further and more specific purposes, features and advantages will clearly appear from the detailed description given below taken in connection with the accompanying drawings which form part of this specification and illustrate merely by way of example one embodiment of the device of the invention. In the following description and in the claims, parts will be identified by specific names for convenience, but such names are intended to be as generic in their application to similar parts as the art will permit. Like reference characters denote like parts in the figures of the drawing, in which:

FIG. 1 shows an axial section of the device, with parts being depicted in perspective; and FIG. 2 shows in a larger scale an axial section of a portion of the device shown in FIG. 1.

Referring now in more detail to the drawing illustrating a preferred embodiment by which the invention may be realized, there is shown in FIGS. 1 and 2 a valve housing 1 in which a vertically movable valve body 2 is arranged. Valve body 2 has a ring-shaped valve face 3, whereas a corresponding valve seat 5 is provided in housing 1. A lid 7 having a threaded portion 8 is tightly screwed on top of housing 1 with an intermediary gasket 9 being placed between lid 7 and housing 1. The space 6 above valve body 2 is filled with a cleaning fluid under pressure, by which valve face 3 is pressed against valve seat 5 with a sealing ring 4 being placed between them. A hose connecting piece of tubing 10 is arranged on lid 7 for admitting the cleaning fluid from a water, air or steam supply source.

Valve body 2 has a cylindrical tubular portion 13 which is closed on top by a plate 2'. Cylindrical portion 13 extends downwardly from valve face 3 and protrudes over the lower end of housing 1. It further has elongated openings 14 adjacent valve face 3. The ring-shaped lower end 15 of cylindrical portion 13 has an internal threaded area 16 which engages a ring-shaped member 17, provided with an outwardly-directed flange 17' thereon. Flange 17' has a groove 19 on its upper face. A cap or covering 18, comprising an intersticed member which may consist of a plurality of pieces of densely woven fabric is tightly strapped over flange 17' and is kept in place on member 17 by being clamped between groove 19 and suitably shaped lower face 20 of ring-shaped lower end 15 of cylindrical portion 13. A sealing ring 21 is positioned on the outside of lower end 15, which glidingly seals valve body 2 on the inner cylindrical face 22 of housing 1.

Two holes 23 are arranged on the outside of the cylindrical lower end of housing 1, opposite one another. Holes 23 are slotted as indicated at 24' so that pins 24 and 25 of a semi-circular fork 26 may be inserted therein. Fork 26 is attached to the arm 28' of a tong-like or pincer-like device 28 for holding valve housing 1. A second semi-circular fork 27 is attached to the other arm 28" of device 28 for holding a cylindrical container 33 which has holes 31, 32 on the outside of its wall opposite one another into which pins 29 and 30 of fork 27 are fitted. The lower end of container 33 is closed by a strainer 34, whereas the upper end of container 33 is adapted to press the meat-cutting plate 35, which is to be cleaned, against the lower face of cap 18 by means of device 28. Meat cutters 35 always have a relatively large center hole 36 which is closed by a stopper 37 which may be made of rubber or plastics and the like and which has a thin face sealing plate 37' thereon.

The operation is as follows. A meat-cutting plate 35 is placed on top of container 33 and its center hole 36 is plugged by stopper 37. Valve housing 1 which is held in fork 26 of pliers 28 now is pressed downwardly so that ring-shaped member 17 with cap 18 firmly contacts the upper face of cutting plate 35 which is supported by container 33, which, in turn, is held in fork 27 of device 28. Up to this instant, the pressurized cleaning fluid itself has forced valve 3 against valve seat 5, thus sealing the device and preventing fluid from leaking out. By pressing forks 26, 27 further toward each other, valve face 3 is lifted from valve seat 5 so that cleaning fluid from space 6 may now pass through openings 14 and is forced through the woven material of cap 18 and through the openings 35' of plate 35, cleaning the same by pressurized fluid. Meat particles which are driven out of holes 35' are collected in container 33 whereas the cleaning fluid may drain through strainer 34 for re-use. For practical reasons, ring-shaped member 17 has a smaller diameter than the average meat-cutting plate 35, because limiting the area of cutting plate 35 which is contacted by ring-shaped member 17 provides for a more concentrated, more intense and faster cleaning than attempting to clean the entire plate in one operation by a larger member 17, whereby a loss of pressure per square inch would occur. Obviously, only the time when forks 26, 27 of device 28 are pressed together cleaning fluid would flow, so that a waste of fluid is avoided. If a hole 35' of plate 35 is plugged by a bone particle which could not be removed by the fluid, a pin 38 is provided in a little groove on one of the arms of device 28, for example, on arm 28'. In order to take the device apart when not in use, at least one of holes 23 is slotted so that device 28 can be easily slipped off valve housing 1.

While the invention has been described and illustrated with respect to a certain preferred example which gives satisfactory results, it will be understood by those skilled in the art after understanding the principle of this invention, that various other changes and modifications may be made without departing from the spirit and scope of the invention, and it is intended therefore in the appended claims to cover all such changes and modifications.

I claim:

1. A device for cleaning a cutting plate having holes therein, comprising a valve housing, means to admit a cleaning fluid to said housing, a valve seat within said housing, a movable valve body in said housing, said valve body having a valve face adapted for sealing engagement with said seat under the pressure of cleaning fluid, said body having a cylindrical tubular portion provided with openings, said portion having a ring-shaped lower end, a ring-shaped member removably attached to said portion, said member having an outwardly-directed flange, an intersticed member clamped between said flange and said ring-shaped lower end, and means for pressing said intersticed member against said cutting plate and simultaneously lifting said valve face from said valve seat for admitting said fluid to said cutting plate through said openings and through said intersticed member.

2. A device for cleaning a cutting plate according to claim 1, further comprising supporting means for said cutting plate.

3. A device for cleaning a cutting plate according to claim 2, and said pressing means comprising tong-like device having forked ends, one forked end engaging said housing and the other forked end engaging said supporting means.

4. A device for cleaning a cutting plate according to claim 2, and said pressing means comprising a tong-like device having forked ends, one forked end engaging said housing and the other forked end engaging said supporting means, said supporting means comprising a receptacle and a strainer in said receptacle.

5. A device for cleaning a cutting plate having holes therein, comprising a valve housing, means to admit a cleaning fluid to said housing, a valve seat within said housing, a movable valve body in said housing, said valve body having a valve face adapted for sealing engagement with said valve seat under the pressure of said cleaning fluid, said body having a tubular portion provided with at least one opening, said portion having a lower end, a tubular member removably attached to said portion, said member having an outwardly-directed tubular flange, an intersticed member covering said flange and being adapted to be clamped between said flange and said lower end, and means for pressing said intersticed member against said cutting plate and simultaneously lifting said valve face from said valve seat for admitting said fluid to said cutting plate through said opening and through said intersticed member.

6. A device for cleaning a cutting plate according to claim 5, further comprising supporting means for said cutting plate.

7. A device for cleaning a cutting plate according to claim 6, and said pressing means comprising a tong-like device having forked ends, one forked end engaging said housing and the other forked end engaging said supporting means.

8. A device for cleaning a cutting plate according to claim 6, and said pressing means comprising a tong-like device having forked ends, one forked end engaging said housing and the other forked end engaging said supporting means, said supporting means comprising a receptacle and a strainer in said receptacle.

9. Cleaning device for the cutting plate of a machine for comminuting meat or the like edibles, comprising a valve housing, said housing having a tubular connection thereon for admitting cleaning fluid thereto, a valve seat within said housing, a movable valve body slidably extending in said housing, said valve body having a valve face sealingly held against said valve seat under the pressure of said cleaning fluid, said valve body having a cylindrical tubular portion, said cylindrical portion having a ring-shaped lower end, openings in said cylindrical portion, a ring-shaped member removably attached to said cylindrical portion, said member having an outwardly extending annular flange, a cap disposed over said flange, said cap consisting of at least one layer of substantially dense woven fabric, said cap being clamped between said flange and said ring-shaped lower end, and means connected with said valve housing for pressing said flange with said cap against said cutting plate, thereby simultaneously lifting said valve face from said valve seat for admitting said fluid to said cutting plate through said cap.

10. Cleaning device according to claim 9, and comprising supporting means for said cutting plate.

11. Cleaning device according to claim 10, and said pressing means comprising a pincer-like device having forked ends, one forked end engaging said housing and the other forked end engaging said supporting means.

12. Cleaning device according to claim 11, and said supporting means having a strainer on the lower end thereof.

References Cited

UNITED STATES PATENTS 784,755  3/1905  Pein _____ 134—44

FOREIGN PATENTS 18,195  8/1906  Great Britain.

ROBERT W. MICHELL, *Primary Examiner.*